United States Patent [19]

Middleton

[11] 4,197,322

[45] Apr. 8, 1980

[54] PROCESS FOR PRODUCING SYNTHETIC CHEESE

[75] Inventor: Jerry L. Middleton, Wauwatosa, Wis.

[73] Assignee: Universal Foods Corporation, Milwaukee, Wis.

[21] Appl. No.: 907,437

[22] Filed: May 19, 1978

Related U.S. Application Data

[63] Continuation-in-part of Ser. No. 794,808, May 9, 1977, abandoned, which is a continuation-in-part of Ser. No. 525,549, Nov. 20, 1974, abandoned.

[51] Int. Cl.$^2$ ................... A23C 19/00; A23C 19/02; A23C 19/12

[52] U.S. Cl. ........................................ 426/36; 426/40; 426/582

[58] Field of Search ................ 426/36, 38, 39, 40, 426/582

[56] References Cited

U.S. PATENT DOCUMENTS

3,502,481 3/1970 Schaap et al. ...................... 426/582

3,922,374 11/1975 Bell et al. .......................... 426/582

FOREIGN PATENT DOCUMENTS

545750 9/1957 Canada ..................................... 426/36
3712413 2/1960 Japan .

OTHER PUBLICATIONS

Kosikowski F., Cheese and Fermented Milk Foods, Publ. by the Author, Cornell University, N.Y. 1966, (pp. 294-296).

Primary Examiner—David M. Naff
Attorney, Agent, or Firm—Neuman, Williams, Anderson & Olson

[57] ABSTRACT

An imitation or synthetic cheese product is produced by reacting an acid precipitated casein with a basic calcium salt to produce a calcium caseinate solution, adding acid to adjust the pH of the calcium caseinate solution, forming a curd of the calcium caseinate by treatment with a coagulating enzyme and admixing the curd with an edible oil or fat, a non-toxic emulsifying agent and acid to produce a cheese-like product having a taste, texture and flavor similar to natural dairy cheese.

9 Claims, No Drawings

PROCESS FOR PRODUCING SYNTHETIC CHEESE

BACKGROUND OF THE INVENTION

Cross Reference to Related Applications

This is a continuation-in-part of my application Ser. No. 794,808, filed May 9, 1977, which, in turn, is a continuation-in-part of my Ser. No. 525,549, filed Nov. 20, 1974, both now abandoned.

Field of the Invention

The field of the present invention is the manufacture of synthetic or imitation cheese-like food products.

Brief Description of the Prior Art

The manufacture of natural dairy cheese conventionally involves the treatment of milk products, including inoculation with particular and specific strains of microorganisms, followed by ripening and aging for various periods of time, depending upon the established standard of identity for the particular cheese product.

In view of the costs, both in respect to raw material and holding time involved in traditional procedures for natural cheese manufacture, the food industry has attempted to produce processed cheese or cheese-like food materials which have a relatively high food value, similar in many cases to naturally produced cheese, at least with respect to the protein content thereof, and which, furthermore, have the general taste and texture of natural cheese. These products are made from other edible foodgrade starting materials, preferably lower in cost than the milk products used for cheese manufacture. There has long been a need in the industry for such synthetic or imitation cheeses which would be acceptable to the public from the point of view of taste, texture and nutritional value, especially when the cheese materials are used as a component or ingredient in traditional recipes which employ natural cheese such as, for example, salad dressings, pizzas, lasagna, omelets, cheese-flavored pastries and the like.

Some approaches producing such processed, imitation or synthetic cheeses are as follows:

A synthetic cheese is described in U.S. Pat. No. 3,806,606, patented Apr. 23, 1974, which is prepared by homogenizing a composition containing 10 to 40% of a narrow melting range fat having a solid content index of less than 3 at 92° F. and from 15 to 25 at 70° F.; from 10 to 25% wheat gluten; from 3 to 6% of egg white, from 3 to 6% gelatin, flavor and water followed by heat treatment to set the composition.

The product is said to have the eating qualities of natural cheese to a great extent and is a successful synthetic imitation of a natural dairy cheese product.

U.S. Pat. No. 3,694,219, patented Sept. 26, 1972, describes a spreadable food material from heat-treated soybean flour, water and a cheese processing salt. This product is sometimes mixed with additional cheese material and is described as having a taste or flavor similar to cheese.

An edible pasteurized process cheese composition is described in U.S. Pat. No. 3,244,535, which includes a homogeneous reaction mixture of cheese and an emulsifying proportion of sodium aluminum phosphate. This process, however, uses a natural cheese starting material to produce a processed cheese food which has good storage stability. A similar process is described in U.S. Pat. No. 3,615,586.

One of the difficulties with the prior art processes has been a cost problem since many of the techniques for making process cheese or imitation cheese involve the use of natural cheese materials which constitute a substantial portion of the imitation or synthetic cheese product. Obviously, the elimination of the natural dairy cheese components would represent a cost savings over these processes. Likewise, many of the processes of the prior art rely on natural cheese for a flavor or taste of the material and, therefore, represent a problem from the point of view of uniformity of flavor and control over the composition of the product that is finally produced. Finally, one of the difficulties of the prior art has been the obtaining of a synthetic or imitation cheese product which has uniformity of taste and texture normally associated with natural cheese products. Obviously, it is necessary to achieve these desiderata in order for the imitation cheese product to be acceptable to the consuming public.

SUMMARY OF THE INVENTION

The process of the present invention includes the production of an imitation cheese food product having the flavor and texture of natural dairy cheese, which process comprises forming a calcium caseinate curd and admixing of the curd with an edible oil to produce a cheese-like product.

Broadly, the present invention also includes the formation of a calcium caseinate curd by a process comprising:

(a) forming an aqueous suspension of an acid precipitated casein;

(b) reacting said suspension with a basic calcium salt to form a calcium caseinate solution;

(c) adding a milk coagulating enzyme to said solution to form a calcium caseinate curd in an aqueous medium;

(d) separating the curd from the aqueous medium; and (e) admixing the curd with an edible oil.

The casein used in the curd-forming process can generally be acid casein from any source or type. Included within this group are acid caseins obtained by precipitation of casein solutions using non-toxic acids such as lactic, hydrochloric or sulfuric acids as the precipitating agent. These caseins are also referred to as isoelectric caseins. The casein may be in the form of a dry solid or a wet suspended solid.

The basic calcium salt is preferably calcium hydroxide $[Ca(OH)_2]$.

It has been determined that the reaction of basic calcium salts with casein takes place most readily in aqueous media, preferably at a pH of neutral (7) or in the basic range (pH above 7).

The ratio of basic calcium salt to casein employed in the amount required to produce the calcium caseinate, most usually at least about $7.5 \times 10^{-4}$ equivalents of a basic calcium salt $[Ca(OH)_2]$ per gram of casein or more. A slight excess, i.e., 20%, is desirable in this process step. Generally, this minimum may be expressed as about 0.028 gram of calcium hydroxide per gram of casein, and with the noted excess of 20%, about 0.035 gram of calcium hydroxide per gram of casein. In a preferred form of this invention, the reaction of basic calcium salt with casein is carried out in the presence of a soluble, non-toxic, edible calcium salt of which calcium chloride is preferred. These calcium salts should preferably be neutral and not contribute to or produce adverse flavors in the final product. The use of such calcium salts enhances the properties of the curd and final synthetic cheese product providing superior body and melting characteristics. More particularly, the addition of the calcium salts optimizes certain properties of the resultant synthetic cheese such as the string and melt characteristics, as well as the opacity of the product. Thus, in a mozzarella or cooking-type cheese used on pizzas or the like, the optimum "string" and melt are provided by a calcium chloride salt. In the case where little or no string is required or desired, such as in the case of an imitation American cheese, no calcium chloride is used. It is believed that this beneficial result is because of additional cross-linkage provided by the calcium ions, but the exact mechanism is not known. The calcium chloride is added in varying amounts depending on casein concentration in the initial dispersion. Thus, at 3% casein levels, approximately 7 grams of $CaCl_2$ (dry basis) per gram of calcium hydroxide; and at 12% casein approximately one gram of $CaCl_2$ per gram of $Ca(OH)_2$. More broadly, the calcium chloride may be employed at a ratio of 0.8 to 11 parts per part of calcium hydroxide at casein concentrations of from 3 to 15%.

The aqueous casein suspension is usually at a solids content of from about 2 or 3 to about 15%, but 3 to 9% is preferred, although higher solids contents (above 15%) can be employed, but handling is difficult at these higher concentrations.

The calcium caseinate formation is usually carried out at temperatures above room temperature, preferably 90°–110° F., although lower or higher temperatures can be used. The solubilization or reaction occurs by the formation of a milky solution or sol generally substantially free of observable solids. The time required varies with temperature, but in the preferred range is usually complete in from ½ to 1½ hours. Optimum time is ¾ to 1 hour at the preferred temperature of 90°–110° F., or in the most preferred 95°–100° F. range. Excessively high temperatures are to be avoided to prevent alteration of the casein but also because the subsequent curd formation by the use of enzymes typically occurs optimally at lower temperatures (below 110° F.) and this would require cooling. Moreover, the enzymes are inactivated by excessive heat, thereby precluding curd formation or rendering curd formation less efficient.

The calcium caseinate solution formed by the above procedure is then employed to form a calcium caseinate curd by adding a curd-forming or milk-coagulating enzyme to the calcium caseinate solution. These enzymes are typically rennet or fungal, rennet being preferred. The rennet enzyme usually provides optimum results at 97° F. and at acid pH conditions. The temperatures can thus range from about 80 to 105° F., but 90°–100° F. is preferred.

The enzymes, such as rennet, are also characterized as being optimally effective at particular pH's. The preferred pH range for the enzymes is from about 5.9 to 6.9, preferably 6.0 to 6.5 with about 6.15 being optimum. Since the calcium caseinate formation requires an alkaline condition or media, it is necessary to acidify the media to achieve the optimum results in the curd-forming step which is best carried out in the acid range as noted above.

This pH adjustment may be accomplished by the use of edible non-toxic acids such as acetic and lactic or inorganic acids such as sulfuric or phosphoric acid, but acetic and phosphoric acid are preferred. Hydrochloric acid is not particularly suitable.

The total time required for curd formation will vary but generally from 30 seconds to 8 to 10 minutes is sufficient, although a longer time may be used. A short curd formation time period such as 2 to 3 minutes is preferred since it has been found that coarse particles of curd which filter and dewater more readily are rapidly formed and the coarse particles become finer with time. Thus, the time of curd formation may be expressed as a function of size and ease of dewaterability, the time when the dewaterable, readily filterable curd is formed being optimum. Dewatering of the curd may be accomplished by conventional methods, i.e., screening, decanting, filtering and the like. The dewatered curd generally has a solids content of from 30 to 40%.

The formation of a calcium salt solution of the casein, followed by curd formation and dewatering of the resultant curd, provides a method of purifying commercially available acid caseins, usually available as dry solids, but also available as wet solid suspensions in water or whey. These acid or isoelectric caseins often have "off" odors or flavors associated with them and are by no means of standard purity or flavor. To provide a standard starting material for the synthetic or substituted cheeses, the above sequence of steps is employed and by that means a quality of flavor or taste in the final product is controlled or substantially assured. The solution-curd forming step results in the "off" flavors or odor factors being largely partitioned in the aqueous supernate of the curd formed and they are removed from the casein curd in the dewatering step and discarded, leaving a relatively bland curd free of undesired flavors and tastes.

The synthetic or imitation product is prepared by admixing the calcium caseinate curd with an edible oil or fat in a sequence of blending steps. Edible oils are preferably those which have a Wiley melting point in the range of 70° to 115° F. Alternatively, the edible oils or fats may be further defined as those which have a Solid Fat Index (SFI) of the following ranges at the temperatures indicated.

|  | SFI |
| --- | --- |
| 50° F. | 20–75 |
| 70° F. | 0–60 |
| 80° F. | 0–50 |
| 92° F. | 0–25 |
| 100° F. | 0–15 |
| 110° F. | 0 |

Preferably, the oil or fat is a vegetable oil or a blend of vegetable oils such as a mixture of soybean, cottonseed and coconut oils. A 100% soybean oil (hydrogenated) may also be used, as well as hydrogenated cottonseed oil or corn oil. Animal fats or oils may also be employed, such as butter, butter oil or lard.

The ratio of calcium caseinate curd to fat or oil is variable but generally the final synthetic cheese product should have a protein content (contributed by the casein) of from 20 to 30% by weight (as is basis). The moisture content of the dewatered curd is, of course, also variable, but usually is about 60 to 70% moisture, which should be taken into account in the blending of curd and oil (or fat) to make the final product. The ratio of protein (casein in curd) to fat may vary, but generally from 1 to 1.5 parts of protein (dry basis) per part of fat or oil is satisfactory, although other ratios, i.e., 0.7 or 0.8 to 1.7 parts of protein (curd solids) comparable to the ratio of protein to fat found in natural cheeses may be used.

The final product is prepared in two mixing step sequences. In the first step, the curd, oil, salt and emulsifier are blended together at elevated temperatures, preferably above 140° F. to assure smooth melting and blending and most preferably temperatures of 165°–170° F., up to 180° F., for a short time, but sufficient to assure pasteurization are used. The time required is usually 1½ to 3 minutes, preferably from 2 to 2½ minutes. After the initial blending step, an acid is added to the mix. The acids used in order of preference are adipic, lactic, acetic and citric, but may also include other acids which are non-toxic and do not add an undesirable flavor note. The pH of the mix as adjusted by the acid should be 5 or above. After addition of the acid, the hot composition is subjected to further mixing under homogenizing conditions for a short time, i.e., 2 minutes, at elevated temperatures (165°–170° F.) to obtain a homogeneous, smooth blend.

The emulsifier preferably is a phosphate salt type such as potassium aluminum phosphate or the less preferred dipotassium phosphates or the like. Salt (NaCl) and other flavorants are added to taste.

One of the unusual features of the present invention, as noted above, is that it permits the use of casein per se from any source. Ordinarily, these caseins frequently have off-flavors which carry through to products incorporating it and these off-flavors are considered undesirable by the consuming public. The process of the present invention, however, has a washing/purifying action which removes these off-flavors or adverse flavor notes from the casein starting material and they do not appear in the final product.

DETAILED DESCRIPTION OF THE INVENTION

The following specific examples will illustrate the manufacture of a particular type of imitation cheese by the process of the present invention.

EXAMPLE 1

A synthetic mozzarella cheese was produced by the following procedure: One thousand grams of water was heated to between 95° and 97° F. To the heated water was added 0.85 gram of calcium hydroxide and 30 grams of acid casein. The suspension was maintained between 95° and 97° F. with stirring for a period of one hour at which time reaction between these two materials was complete. At this point, 1.9 grams of a 20% calcium chloride solution was added, the pH was adjusted to about 6.15 by the addition of phosphoric acid, and 0.4 ml of single strength rennet added. The mixture was then stirred for an additional period of one-half hour at 95° to 97° F. At the end of this time a semi-solid, calcium caseinate curd had formed which was dewatered to separate the curd solids. Sixty-seven grams of the dewatered curd (27 grams of calcium caseinate and 40 grams of water) was placed in a jacketed laboratory blender/cooker and blended with 18.8 grams of emulsified vegetable oil (a blend of soybean oil, cottonseed oil and coconut oil), 1.5 grams of salt and 1.5 grams of sodium aluminum phosphate, and 5 grams of water to allow for evaporation during process. The mixture was heated with agitation and blending to 165°–170° F. When a smooth admixture was achieved, 1.2 grams of adipic acid was added to the heated, blended product to adjust the pH to 5.2 and the material stirred under homogenizing conditions until a totally homogeneous product was obtained (approximately 2 minutes). The hot product was then placed in a container and refrigerated.

The cooled product has a body and texture almost identical to that of natural mozzarella cheese with a relatively bland flavor. The product was stored under normal refrigeration conditions (cooler temperatures of about 45° F.). Inspection of random samples of the synthetic mozzarella cheese product after three months indicated no change or deterioration of the product from the point of view of either flavor, body or texture.

The synthetic, imitation cheese product produced by the foregoing procedure was sufficiently close in flavor, body, texture and appearance to be used as a complete replacement for natural dairy mozzarella cheese.

Other examples of the process are as follows:

EXAMPLE 2

Example 1 was repeated, except that 30 grams of casein was reacted with 0.85 gram of calcium hydroxide and 7 grams (dry basis) of calcium chloride. Acetic acid was used in the coagulation step. The final product has similar excellent texture as the product of Example 1.

EXAMPLE 3

Example 2 was repeated in modified form using 1500 grams water, 45 grams casein, 1.58 grams of calcium hydroxide and no calcium chloride. The product produced was acceptable however, melt and flow characteristics were not as desirable as achieved with product (Example 1 or 2) made with calcium chloride.

EXAMPLES 4 and 5

Following the general procedure of Example 2, an acceptable synthetic mozzarella was prepared by blending the curd with hydrogenated soybean oil on the following basis:

| Example 4 | 23 parts protein (curd solids) |
|  | 22.5 parts oil |
| Example 5 | 27 parts protein (curd solids) |
|  | 18.5 parts oil |

EXAMPLES 6 THROUGH 10

The following are examples of different blends of oils (consisting essentially of soybean and cottonseed oils) used in the process of Example 1 to prepare synthetic mozzarella cheese. The final products had the same excellent characteristics as the product of Example 1.

| EXAMPLE | 6 | 7 | 8 | 9 | 10 |
|---|---|---|---|---|---|
| WMP (°F.)[1] | 99 | 105 | 98 | 93 | 73.5 |
| Temperature °F. | SOLID FAT INDEX | | | | |
| 50 | 68 | 62 | 65 | 49 | 27 |
| 70 | 57 | 49 | 52 | 30 | 2 |
| 80 | 50 | 43 | 45 | 20 | 0 |
| 92 | 23 | 23 | 18 | 4 | 0 |
| 100 | 4 | 9 | 3 | 0.3 | 0 |
| 110 | 0 | 0 | 0 | 0 | 0 |

[1]Wiley Melting Point ±2° F.

The following are examples of production-type runs manufacturing an American and mozzarella synthetic cheese-type product.

EXAMPLE 11

A synthetic process American cheese was produced by the following procedure: Five hundred and fifty pounds of water was heated to between 91° and 92° F. To the heated water was added 1 lb 6 oz of calcium hydroxide and 38 lbs 14 oz of lactic acid casein. The suspension, having a pH of 9.9, was maintained at 91°–92° F. with stirring for a period of 1½ hours, at which time reaction between these two materials was complete and a solution essentially free of observable solids was produced. No calcium chloride was added and the pH was adjusted to about 6.15 with acetic acid and 91 ml of single strength rennet added. The acidified mixture was then stirred for an additional period of 3 minutes at 91° to 92° F. At the end of this time a semi-solid, calcium caseinate curd had formed which was dewatered to separate the curd solids. Ninety-one and one-half lbs of the dewatered curd was placed in a jacketed pilot blender/cooker and blended with 35 lbs of emulsified vegetable oil, 2.6 lbs of salt, 2.0 lbs disodium phosphate duohydrate and 3 lbs of water to allow for evaporation during process. The mixture was heated and blended with agitation to 165°–175° F. When a smooth blended admixture was achieved, 190 gm. of adipic acid was added to the heated, blended product to adjust the pH to 5.2 and the material vigorously stirred under homogenizing conditions until a totally homogeneous product was obtained (approximately 5 minutes). The hot product was then placed in a container and refrigerated.

The cooled product has a body and texture almost identical to that of natural processed American cheese. The product was stored under normal refrigeration conditions (cooler temperatures of about 45° F.). Inspection of random samples of the synthetic processed American cheese product after three months indicated no change or deterioration of the product from the point of view of either flavor, body or texture.

EXAMPLE 12

A synthetic mozzarella cheese was produced by the following procedure: Twenty thousand fifty gallons of water was heated to between 91° and 92° F. To the heated water was added 44 lbs of calcium hydroxide and 1212 lbs lactic acid casein powder. The resulting acid casein suspension was maintained between 91° and 92° F. with stirring for a period of 1½ hours, at which time reaction between these two materials was complete, resulting in a solution essentially free of observable solids. At this point 600 lbs of a 10% calcium chloride solution was added, the pH was adjusted to about 6.15 by the addition of 11,750 ml of glacial acetid acid, and 88 oz of single strength rennet added. The mixture was then stirred for an additional period of three minutes at 91° to 92° F. At the end of this time a semi-solid, calcium caseinate curd had formed which was dewatered to separate the curd solids. Seven hundred and twenty pounds of the dewatered curd (267 lbs of calcium caseinate and 453 of water) was placed in a jacketed blender/cooker and blended with 225 lbs of emulsified vegetable oil, 20 lbs of salt, 15 lbs of sodium aluminum phosphate and 30 lbs of water to allow for evaporation during process. The mixture was heated and blended with agitation to 165°–170° F. When a smooth, blended admixture was achieved, 8.5 lbs of adipic acid was added to the heated, blended product to adjust the pH to 5.2 and the material vigorously stirred under homogenizing conditions until a totally homogeneous product was obtained (approximately 5 minutes). The hot product was then placed in a container and refrigerated.

The cooled product has a body and texture almost identical to that of natural mozzarella cheese with a relatively bland flavor. The product was stored under normal refrigeration conditions (cooler temperatures of about 45° F.). Inspection of random samples of the synthetic mozzarella cheese product after three months indicated no change or deterioration of the product from the point of view of either flavor, body or texture.

One of the aspects of the foregoing process is the formation of a calcium caseinate curd by the use of calcium hydroxide and calcium chloride, which curd is essentially free of off-tastes and odors associated with casein and which has the body characteristics suitable for use as the protein component of a synthetic cheese when mixed with oil and when so mixed, provides a meltable cheese product.

The process of the invention is suitable for preparing synthetic cheese-type food products which are suitable replacements for mozzarella, American, cheddar and other type cheeses from the point of view of taste, texture and nutritional value.

What is claimed is:

1. A process for producing an imitation cheese which consists essentially of:
   (a) forming an aqueous suspension of acid precipitated casein containing undesirable flavor and odor elements having a solids content of from about 3 to about 15%;
   (b) reacting said casein with a basic calcium salt and a neutral calcium salt, said basic calcium salt being present in an amount of at least 7.5 to $10^{-4}$ equivalents per gram of casein (dry basis) and said neutral calcium salt being calcium chloride present in an amount of from 0.8 to 11 parts per part of said basic calcium salt, said reaction being carried out at a temperature above 80° F. and at an alkaline pH of 7 or above for a period of time sufficient to form a calcium caseinate solution essentially free of observable solids;
   (c) adjusting the pH of said solution to between about 5.9 and 6.9 by the addition of an acid selected from the group consisting of acetic, lactic, phosphoric and sulfuric acids, and adding a casein coagulating enzyme to said solution of calcium caseinate at a temperature between about 80° and 110° F. to form a solid calcium caseinate curd in a supernate aqueous solution;
   (d) separating the curd from the aqueous portion of admixture containing the undesirable odor and flavor elements present in the original casein starting material to obtain a curd substantially free of undesirable taste and odor elements;
   (e) admixing the curd with an edible oil, together with salt and an edible, non-toxic emulsifying agent at a temperature of about 140° F. to produce a smooth blended admixture; and
   (f) adding an acid selected from the group consisting of adipic, lactic, acetic and citric acids to the blended product at said temperature produced in step (e) to acidify the blended product to a pH of 5 or above and vigorously admixing the same under homogenizing conditions to produce a homogeneous melted and pasteurized product.

2. A process according to claim 1 wherein the basic calcium salt is calcium hydroxide.

3. A process according to claim 1 where said coagulation is carried out employing an enzyme selected from the group of rennet enzyme and fungal enzyme.

4. A process according to claim 3 wherein said pH of step (c) is in the range of 6.0 to 6.5.

5. A process according to claim 3 wherein the temperature of the casein coagulation step is between about 80° and 105° F., the enzyme is rennet and the pH is between 6.0 and 6.5.

6. A process according to claim 1 wherein said edible oil has a Wiley Melting Point of from 70° to 115° F.

7. A process according to claim 6 wherein the wet calcium caseinate curd is admixed with the edible oil in a ratio of from about 0.7 to 1.7 parts of caseinate protein per part of oil on a dry weight basis.

8. A process according to claim 7 wherein said ratio is from 1.0 to 1.5.

9. A process for producing an imitation American cheese which consists essentially of:
  (a) forming an aqueous suspension of acid precipitated casein containing undesirable flavor and odor elements having a solids content of from about 3 to about 15%;
  (b) reacting said casein with a basic calcium salt, said basic calcium salt being present in an amount of at least 7.5 to $10^{-4}$ equivalents per gram of casein (dry basis), said reaction being carried out at a temperature above 80° F. and at a pH of 7 or above for a period of time sufficient to form a calcium caseinate solution essentially free of observable solids;
  (c) adjusting the pH of said solution to between about 5.9 and 6.9 by the addition of an acid selected from the group consisting of acetic, lactic, phosphoric and sulfuric acids, and adding a casein coagulating enzyme to said solution of calcium caseinate at a temperature between about 80° and 110° F. to form a solid calcium caseinate curd in a supernate aqueous solution;
  (d) separating the curd from the aqueous portion of admixture containing the undesirable odor and flavor elements present in the original casein starting material to obtain a curd substantially free of undesirable taste and odor elements;
  (e) admixing the curd with an edible oil, together with salt and an edible, non-toxic emulsifying agent at a temperature of above 140° F. to produce a smooth blended admixture; and
  (f) adding an acid selected from the group consisting of adipic, lactic, acetic and citric acids to the blended product at said temperature produced in step (e) to acidify the blended product to a pH of 5 or above and vigorously admixing the same under homogenizing conditions to produce a homogeneous melted and pasteurized product.

* * * * *